Patented Feb. 14, 1933

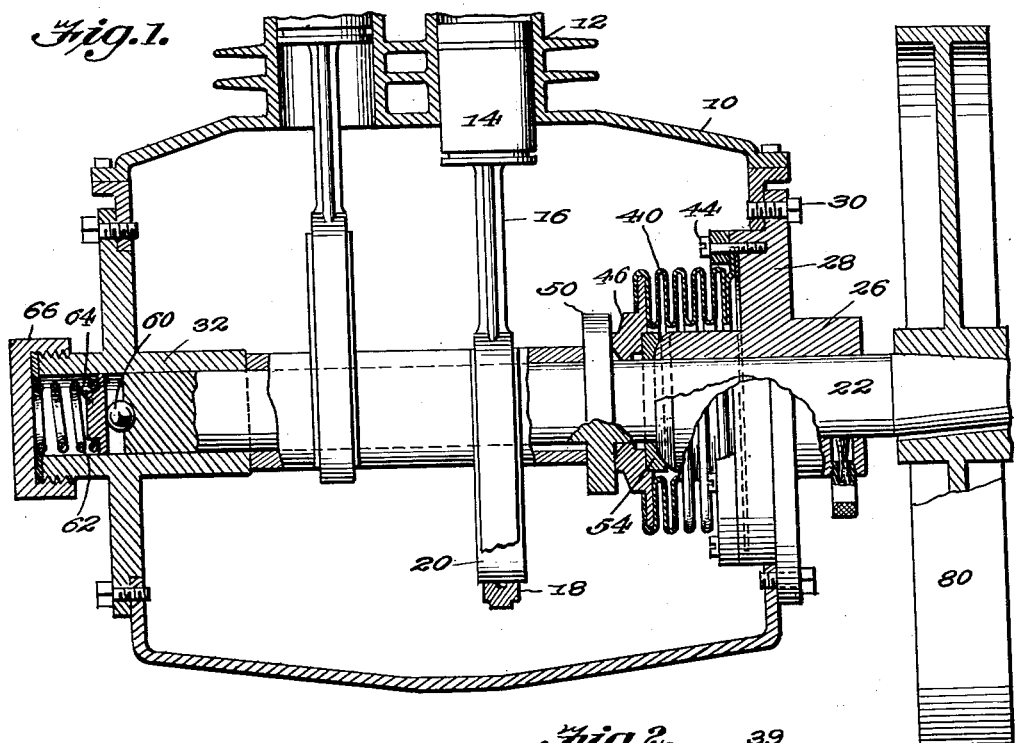
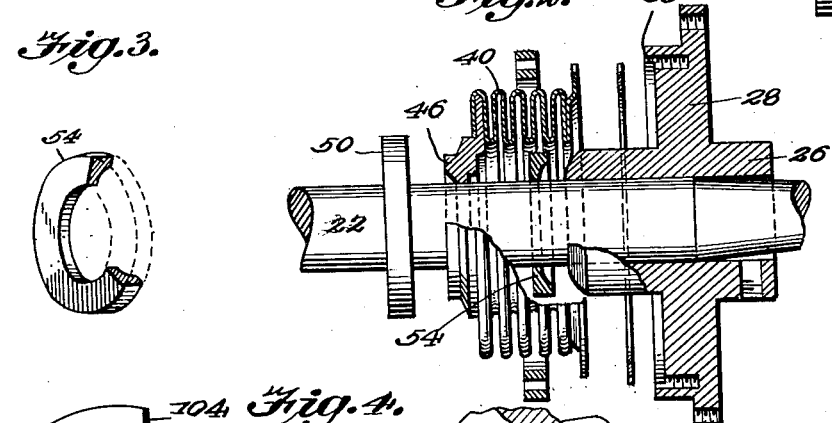
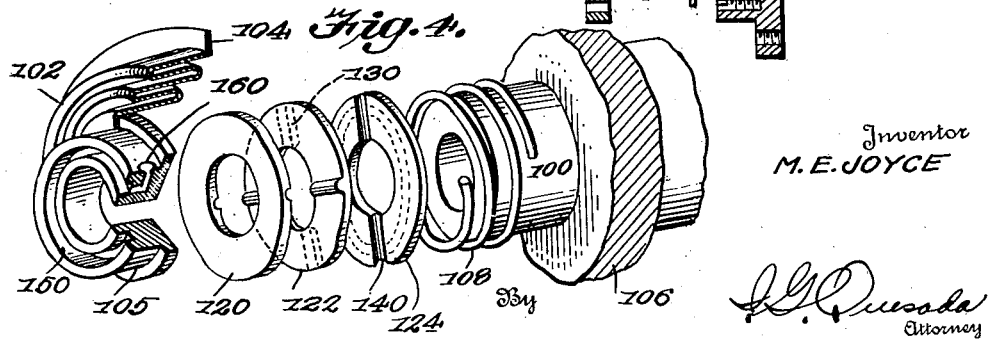

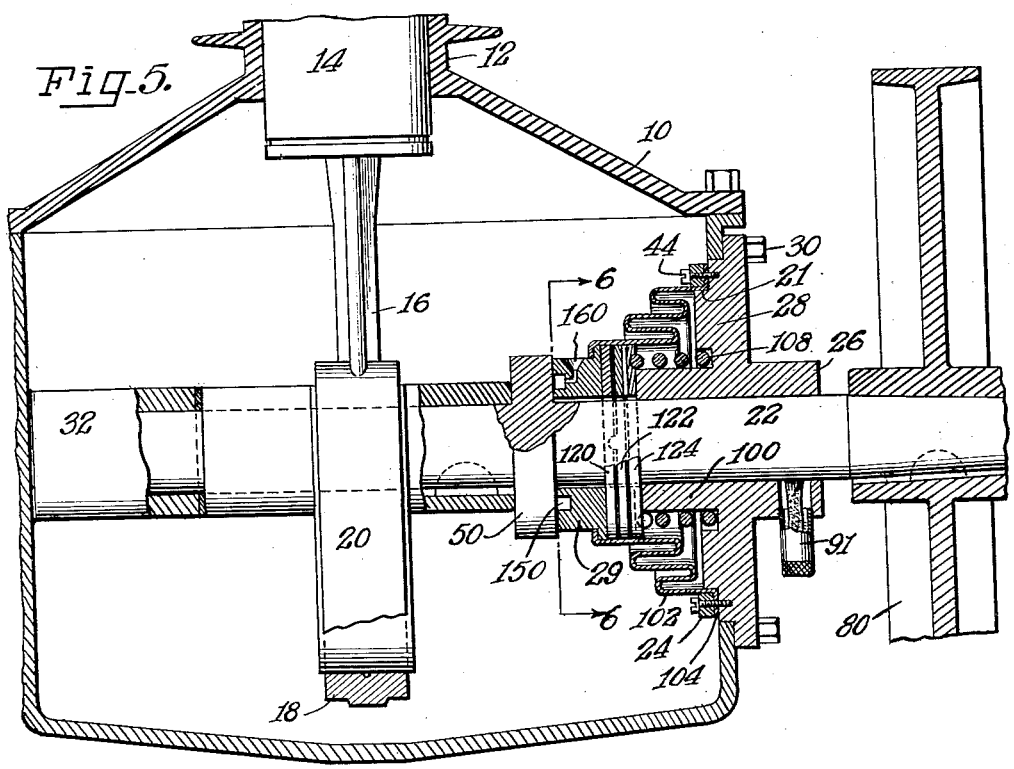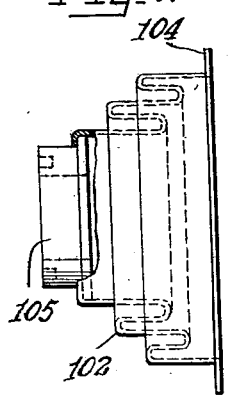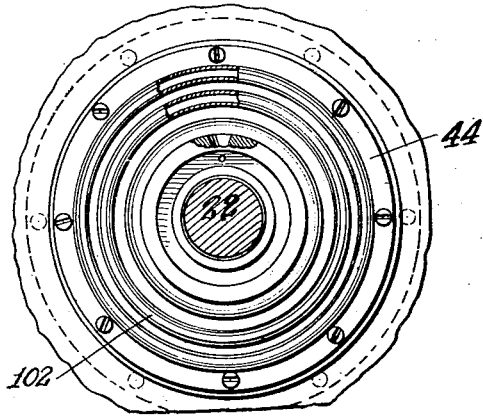

1,897,937

UNITED STATES PATENT OFFICE

MAURICE E. JOYCE, OF BRENTWOOD, MARYLAND, ASSIGNOR OF ONE-HALF TO EDWARD L. MAHONEY, OF LANHAM, MARYLAND

SEAL FOR COMPRESSORS

Application filed July 28, 1932. Serial No. 625,387.

This invention relates to refrigerating apparatus and has special reference to a seal for the crank shaft of a compressor embodied in such apparatus, the application being a continuation in part of my copending application filed Feb. 27, 1932 and serially numbered 595,596.

As is known to those skilled in the art to which this invention relates, a refrigerating fluid such as methyl chloride is circulated thru the crank case of a refrigerating compressor and the pressure of such refrigerant fluctuates over a wide range, sometimes approaching a vacuum and other times being under a pressure of possibly 50 pounds and it is customary to place the sealing element of the sealing sylphon under a constant spring pressure substantially greater than the maximum pressure encountered in the crank case with the result that such spring pressure produces unnecessarily rapid wear between the contacting elements of the seal requiring periodic replacement or re-finishing of the contacting elements of the seal, all of which those interested in the advancement of the industry are seeking to overcome.

With an appreciation of the above and the fact that when a greatly diminished pressure prevails within the crank case it is necessary to resist atmospheric pressure, the herein disclosed invention contemplates the employment of a thrust spring at one end of the crank shaft to serve the dual purpose of first compensating for wear and second resisting atmospheric pressure when a diminished pressure prevails in the crank case, it being noted that the power of this spring may be a few pounds above atmospheric pressure and substantially below the maximum pressure encountered in the crank case for the reason that the arrangement of the bellows is such that the increased pressure prevailing at times within the crank case is balanced about all sides thereof and hence will be prevented from collapsing the bellows and since a thrust spring of a power only a few pounds above atmospheric pressure is employed to maintain a seal as distinguished from the ordinary employment of a spring sufficiently powerful to resist maximum crankcase pressure, the wear between the parts of the seal will be greatly diminished producing long life and service.

In further alluding to the mounting of the sealing bellows or sylphon by which a gastight seal is maintained about the crank shaft, it is pointed out that the same is located principally within the crank case of the compressor so that the thrust collar or sealing ring associated with the bellows is furnished with a constant and generous supply of oil from the crank case allowing of the maintenance of a sealing and friction-avoiding film of oil between the sealing ring and associated shoulder or bearing portion of the crank shaft, which film of lubricant aids in preventing leakage of the refrigerant and the incursion of the atmosphere into the crank case, this arrangement being in contrast to the conventional bellows mounting exteriorly of the crank case where it is, of course, prevented from receiving the full benefit of the crank case lubricant.

Furthermore, the major portion of the sylphon or sealing bellows will be found to be sleeved over or to encircle the crank shaft bearing as distinguished from the customary end-to-end arrangement of these parts, with the result that the required length of the crank shaft between the bearings therefor is reduced and in consequence of this, whipping or lashing of the crank shaft is avoided thereby diminishing wear on the bearings. while at the same time such a telescopic arrangement of the bellows and the shaft bearing encircled thereby allows a generous bearing surface for the crank shaft without a corresponding increase in the length of the shaft.

Another feature of the invention resides in the arrangement by which the sealing bellows and the associated bearing are coupled for application and removal as a unit and by which the sealing ring of the bellows is urged into uniform pressure contact with the cooperating shoulder on the crank shaft to assure uniform and hence long wear from these parts.

The sealing arrangement embodied in this invention will be found to be adaptable to refrigerating compressors without elaborate change in the design thereof and at the same time, such mounting is capable of highly simplified arrangement, economical to maintain and relatively cheap to manufacture.

Other objects and advantages will be apparent during the course of the following description.

In the accompanying drawing, forming a part of this application and in which like numerals are employed to designate like parts throughout the same, Figure 1 is a detailed vertical sectional view thru a compressor, the view illustrating the mounting of the sylphon and associated parts, Figure 2 is a fragmentary vertical sectional view thru the sealing mechanism and the associated shaft, the parts being drawn apart, Figure 3 is a sectional perspective illustrating a sealing ring embodied in the invention, Figure 4 is a fragmentary group sectional perspective illustrating a slight modification of the invention, Figure 5 is a detail vertical sectional view through a compressor, the view illustrating the internal mounting of the sylphon and associated parts, Figure 6 is a vertical transvere sectional view taken on line 6—6 of Figure 5, Figure 7 is a side elevation of the improved sylphon partly broken away.

In the drawing, wherein for the purpose of illustration is shown several preferred embodiments of the invention, the numeral 10 designates a crank case of a refrigerating compressor, the crank case having mounted thereon one or more cylinders 12. As shown in Fig. 1 pistons 14 are mounted for reciprocation within the cylinders 12 and are provided with connecting rods 16 extending from straps 18 of eccentrics 20, the eccentrics being mounted on a crank shaft 22. Although the connection between the connecting rods 16 and the shaft 22 is shown to be thru the intervention of conventional straps 18 and eccentrics 20 it is understood, of course, that the shaft 22 may be provided with cranks of conventional or other design, secured to the rods 16 thru the medium of connecting rod bearings.

As shown in Figure 1, a bearing 26 embraces one end portion of the shaft 22 and is provided with a radial attaching flange 28 having the peripheral portion thereof formed with a plurality of openings registering with similar openings in the adjacent end of the crank case for the reception of fastening devices 30 in the nature of cap screws or the like.

It is clearly shown in Figure 1 that the peripheral portion of the radial flange 28 has the inner corner thereof rabbeted to define a shouldered portion received snugly within the opening in the crankcase thereby defining a means for lining up the bearing 26 with the bearing 32 at the opposite side of the crank case. In other words, the snug fit of the shouldered portion of the flange 28 within the surrounding opening in the crank case serves to fix the position of the bearing 28 as distinguished from the centering of the bearing thru the aid of the fastening devices 30.

In Figure 2 it is clearly shown that the inner surface of the attaching flange 28 is provided with an axially extending shoulder 39 defining what might be said to be an annular groove for the reception of the annular attaching flange formed at the inner end of a sealing bellows or sylphon 40. More specifically, the radial attaching flange formed at the outer end of the sylphon 40 is snugly received within the annular groove defined by the shoulder 39 and is provided with a series of spaced notches mating with similar notches in the shoulder 39 for the reception of fastening devices 44 in form of cap screws or the like.

Figure 2 also illustrates that the sylphon 40 is in the form of a radially corrugated tubular body having the innermost corrugation thereof extending about opposite surfaces of the annular attaching flange of a sealing ring 46 and, of course, the connection between the bellows 40 and the sealing ring 46 thereof may be made permanent and fluid-tight by soldering, brazing or other means.

Of course, the sylphon 40 on the sealing ring 46 is non-rotatably mounted about the crank shaft 22 and the inner surface of the ring 46 bears flatly against the opposed surface of annular shoulder 50 formed on the adjacent portion of the crank shaft.

In carrying out the invention, a thrust washer 54 is associated with or permanently secured to the inner surface of the sealing ring 46 and is provided with a concave surface in opposed contacting relation to the convex end of the bearing 26 and the engagement between the elements 54 and 26 is such that the ring 46 is properly positioned for flatly contacting the opposed surface of the shoulder 50.

That is to say, if the sealing ring 46 is slightly canted on the shaft 22 the engagement of the thrust washer 54 with the convex inner end of the bearing 26 will fix the ring for proper contact with the shoulder 50 and in this manner uniform wear between the parts is assured.

What might be said to be the inner end of the crank shaft 22 is mounted in the bearing 32 and is engaged by a ball 60 in back of which there is an expansion spring 62 and a follower 64, the follower being located between the spring and the ball.

It is shown in Figure 1 that the bearing 32 is provided with an exterior continuation defining a boss to which a cap 66 is threaded and the cap serves as a backing for the spring 62 to place the spring under the required tension.

From Figure 1 it will be seen that the expansion spring 62 urges the shaft 22 endwise to bring about a fluid-tight contact between the opposed surfaces of the members 46 and 50 so that the escape of the refrigerant is prevented and so that the incursion of the atmosphere into the crank case is prevented.

More particularly, and as brought out in the opening paragraphs of this specification, when high pressure prevails within the crank case 10, and such pressure may for the purpose of this specification be assumed to be around fifty (50) pounds, the opposed surfaces of the radially corrugated sylphon 40 are exposed to the temporarily increased pressure within the crank case and such increased pressure is neutralized so far as it has reference to the sylphon with the result that the bellows is not collapsed by the temporary increase in pressure.

Heretofore it has been customary in refrigerating compressors to hold the sealing ring in engagement with a shoulder on the crank shaft through the medium of an expansion spring superior in force to the maximum crank case pressure with the result that excessive wear is produced between the contacting surfaces of the seal, this being true because the expansion spring which is superior to maximum crank case pressure is constantly effective in producing excessive wear between the parts.

Since the crank case pressure is equalized or balanced about the radially corrugated bellows 40 and since the end face of flange or shoulder 50 is urged tighter against the sealing ring upon an internal increase in pressure, it is sufficient that the spring 62 be only slightly superior in force to atmospheric pressure, so that when a diminished pressure or a vacuum prevails within the crank case 10 the power of the spring 62 will be sufficient to resist the incursion of the atmosphere into the crank case.

In other words the power of the spring 62 is definitely and substantially below maximum crank case pressure and is slightly superior to atmospheric pressure so that, while the escape of the refrigerant under the influence of increased pressure is prevented the incursion of the atmosphere into the crank case is likewise prevented, all without creating excessive wear between contacting parts of the seal.

In addition to resisting atmospheric pressure, the spring 62 serves the second and important purpose of compensating for such wear as will take place between the parts 46 and 50.

With further reference to the sylphon 40 it is pointed out that should there be a tendency for the bellows to collapse axially such action is limited by the thrust washer 54 and its contact with the inner end of the bearing 26 and of course, even though there should be a slight recession of the sealing ring 46, due to a slight reduction in the length of the bellows, the spring 62 will move the shaft 22 endwise to maintain an uninterrupted and fluid tight seal between the members 46 and 50.

More specifically, the bearing 26 acts as a fixed stop limiting axial contraction of the bellows 40.

The sleeving or telescoping of the bellows 40 over the inner portion of the bearing 26 provides a relatively long bearing surface for the shaft with a minimum length of the shaft and at the same time reduces the unsupported span of the crank shaft between the bearings 26 and 32. Also, the internal mounting of the bellows permits of the employment of a relatively short shaft with the fly wheel 80 of the shaft positioned rather close to the outer end of the bearing 26, this being in contrast to the mounting of the bellows exteriorly of the crank case in end-to-end relation to the bearing, requiring a substantial increase in the length of the crank shaft for the accommodation of the bellows.

By thus reducing the required length of the motion transmitting shaft 22, whipping and lashing of the shaft is reduced with the result that wear on the bearings is materially diminished.

The mounting of the sealing ring 46 and the associated shoulder 50 within the crank case provides for the constant lubrication of the opposed surfaces of these parts so that a film of oil is maintained at this point to aid in the establishment of a fluid-tight seal and at the same time to avoid rapid wear. A grease cup 91 is provided to lubricate shaft 22, if desired.

In the modified form of invention shown in Figures 4 to 7, the bearing 100 is telescoped or sleeved by a radially stepped corrugated bellows 102 having one end thereof provided with an attaching flange 104 secured to the attaching flange 106 of the bearing 100 thru the intervention of suitable fastening devices such as the anchoring ring 24. As shown in Fig. 5, member 28 is provided with a shoulder 21 on which is sleeved the bellows 102.

In carrying out the modified form of invention shown in Figures 4 to 7, what might be said to be the inner end of the bellows 102 is soldered or brazed about one end of a sealing ring 105 to establish a permanent and fluid-tight contact between these parts. It is clearly illustrated in Figures 4 and 5 that an expansion spring 108 is mounted on the inner portion of the bearing 100 and serves to urge the sealing ring 105 into sealing contact with a shoulder 50 on the shaft, said shoulder being the equivalent of the shoulder 50 shown in Figs. 1 and 2.

The expansive force of the spring 108 is applied uniformly, throughout 360 degrees, to the sealing ring 105 thru the intervention of a thrust washer assembly consisting of washers 120, 122 and 124. The intermediate washer 122 is formed on the opposite surfaces thereof with radial ribs 130, the ribs on one side being spaced 90 degrees from the ribs on the opposite side so that when the ribs are received within the complemental grooves 140 in the washers 120 and 124, a limited universal action between the various washers is allowed, it being noted in this connection that the depth of the grooves 140 is less than the axial dimensions of the ribs 130 to allow a limited rocking motion of the thrust washers with respect to each other.

The mounting of the universal thrust washer assembly between the spring 108 and the sealing ring 105 distributes the expansive force of the spring uniformly about the circumference of the sealing ring and in this manner causes the sealing ring to have uniform pressure contact with the shoulder on the shaft. The uniform pressure contact thus brought about between the sealing ring and the associated shoulder assures uniform and hence long effective wear of these parts.

The shoulder contacting side of the ring 105 is shown in Fig. 4 to be provided between the outer peripheral edges thereof with an annular groove 150. A port 160 opens out through the periphery of the sealing ring to receive lubricant from the crank case and allows the passage of such lubricant to the groove 150. The lubricant thus furnished to the annular groove 150 spreads and forms a film between the sealing ring 105 and the associated shoulder, which film acts as an effective barrier in preventing the escape of the refrigerant from the crank case by way of the bearing 100.

The foregoing illustrates that the invention forming the subject of this application is capable of a wide variety of mechanical expressions and therefore it is to be understood that the form of invention herewith shown and described is to be taken merely as a preferred example of the same and that such minor changes in arrangement and construction of parts may be made as will remain within the spirit of the invention and the scope of what is claimed.

Having thus described the invention what is claimed is:

1. A seal for a compressor shaft wherein a relatively long bearing surface is obtained with a minimum length of the shaft, and in which the shaft bearing projects into the crank case, a corrugated tubular sealing bellows secured to the crank case and having the major portion thereof sleeved over the said bearing and the portion of the shaft embraced by the inwardly projecting portion of the bearing, a sealing ring secured to the inner end of said bellows, said shaft being provided with a shoulder engaged by said sealing ring, and mechanism for maintaining the sealing ring in engagement with said shoulder including a spring urging relative axial movement of said shoulder and sealing ring toward each other and seal aligning means sleeved on the shaft between the sealing ring and the inner end of the bearing.

2. A seal for a compressor shaft wherein a relatively long bearing surface is obtained with a minimum length of the shaft, and in which the shaft bearing projects into the crank case, a corrugated tubular sealing bellows secured to the crank case and having the major portion thereof sleeved over the said bearing and the portion of the shaft embraced by the inwardly projecting portion of the bearing, a sealing ring secured to the inner end of said bellows, and mechanism for maintaining the sealing ring in contact with a shoulder on the shaft including a spring urging said shaft endwise and seal aligning means between the inner end face of the shaft bearing projecting into the casing and the sealing ring.

3. A seal for a compressor shaft wherein a relatively long bearing surface is obtained with a minimum length of the shaft, and in which the shaft bearing projects into the crank case, a corrugated tubular sealing bellows secured to the crank case and having the major portion thereof sleeved over the said bearing and the portion of the shaft embraced by the inwardly projecting portion of the bearing, a sealing ring secured to the inner end of said bellows, said shaft being provided with a shoulder engaged by said sealing ring, and mechanism for maintaining the sealing ring in contact with the shoulder on the shaft including a spring urging said shaft endwise and seal aligning means between the inner end face of the shaft bearing projecting into the casing and the sealing ring, said spring exerting a force sufficient to overcome atmospheric pressure when the pressure in the crank case is below that of the atmosphere.

4. A seal for a compressor shaft, wherein a relatively long bearing surface is obtained with a minimum length of the shaft and in which the shaft bearing projects into the shaft casing, a radially corrugated sealing bellows secured to the shaft casing and having the major portion thereof sleeved over the said bearing and the portion of the shaft embraced by the inwardly projecting portion of the bearing, a sealing ring secured to the inner end of said bellows, said shaft being provided with a shoulder engaged by said sealing ring, a thrust washer between said sealing ring and the bearing to limit contraction of the bellows, and a spring maintaining a fluid-tight contact between said shoulder and said ring and exerting a force sufficient to overcome atmospheric pressure when the pressure in the casing is below that of the atmosphere.

5. A seal for a compressor shaft, wherein a bearing is carried by a shaft casing and embraces a rotatable shaft, a bellows associated with the shaft and the bearing and located within the shaft casing in the presence of a widely fluctuating pressure, said bellows being provided with radial corrugations having side walls exposed to the widely fluctuating pressure in the shaft casing whereby the tendency of the bellows to collapse under an increased pressure is neutralized, a sealing ring carried by the bellows and encircling the shaft, a shoulder carried by the shaft and engaged by said sealing ring, and mechanism to compensate for wear between the sealing ring and shoulder and for maintaining the sealing ring in fluid-tight engagement with the shoulder including a spring urging the shaft endwise and seal aligning means between the inner end face of the bearing and the sealing ring, said spring exerting a force sufficient to overcome atmospheric pressure to resist the incursion of the atmosphere into the casing when a diminished pressure prevails within the casing.

6. A seal for a compressor shaft, wherein a bearing is carried by a shaft casing and embraces a rotatable shaft, a bellows associated with the shaft and the bearing and located within the shaft casing in the presence of a widely fluctuating pressure, said bellows being provided with radial corrugations having side walls exposed to the widely fluctuating pressure in the shaft casing whereby the tendency of the bellows to collapse under an increased pressure is neutralized, a sealing ring carried by the bellows and encircling the shaft, a shoulder carried by the shaft and engaged by said sealing ring, a spring urging the shaft endwise to compensate for wear between the sealing ring and said shoulder and exerting a force superior to atmospheric pressure to resist the incursion of the atmosphere into the shaft casing when a diminished pressure prevails within the shaft casing, and a thrust washer between said sealing ring and said bearing to limit axial contraction of said bellows.

7. A seal for a compressor shaft, wherein a bearing is carried by a shaft casing and embraces a rotatable shaft, a bellows associated with the shaft and the bearing and located within the shaft casing in the presence of a widely fluctuating pressure, said bellows being provided with radial corrugations having side walls exposed to the widely fluctuating pressure in the shaft casing whereby the tendency of the bellows to collapse under an increased pressure is neutralized, a sealing ring carried by the bellows and encircling the shaft, a shoulder carried by the shaft and engaged by said sealing ring, a spring urging the shaft endwise to compensate for wear between the sealing ring and said shoulder and exerting a force superior to atmospheric pressure to resist the incursion of the atmosphere into the shaft casing when a diminished pressure prevails within the shaft casing, and a thrust washer between said sealing ring and said bearing to limit axial contraction of said bellows, said thrust washer and the inner end of said bearing being provided with complemental concave and convex surfaces.

8. A seal for a compressor shaft wherein a relatively long bearing surface is obtained with a minimum length of the shaft, and in which the shaft bearing projects into the shaft casing, a corrugated tubular sealing bellows secured to the shaft casing and having the major portion thereof sleeved over the said bearing and the portion of the shaft embraced by the adjacent portion of the bearing, a sealing ring secured to the inner end of said bellows, said shaft being provided with a shoulder engaged by said sealing ring, and a spring urging said ring in the direction of said shoulder, there being means between the spring and the ring to distribute the force of said spring uniformly about the circumference of the ring.

9. A seal for a compressor shaft wherein a relatively long bearing surface is obtained with a minimum length of the shaft and in which a shaft bearing projects into the shaft casing, a tubular sealing bellows having the major portion thereof sleeved over the bearing and the portion of the shaft embraced by the adjacent portion of the bearing, said bellows being provided with radially overlapping stepped corrugations having inner and outer walls extending substantially parallel to the axis of the bellows, co-acting sealing elements carried by the shaft and the inner portion of said bellows, and a spring urging said co-acting sealing elements together, and means between the spring and said co-acting sealing elements to distribute the force of said spring uniformly about the circumference of the sealing elements.

10. In a compressor, a crank case having an opening, a bearing having an attaching portion fitted snugly within said opening, a bellows having one end portion thereof secured to the attaching portion of said bearing, a sealing ring carried by said bellows, and a shaft embraced by said bearing and said sealing ring, a spring surrounding said bearing, and a washer assembly between said spring and said sealing ring and embodying a plurality of rockably connected elements distributing the force of said spring about the opposed surface of said sealing ring.

11. In a compressor, a case, a bearing carried by the case, a bellows embracing the bearing and having a sealing ring, a spring associated with the bearing, and means between the spring and the sealing element to distribute the expansive force of said spring about the opposed surface of said sealing element and embodying a plurality of annuli having radial interfitting tongues and grooves, the tongues having axial dimensions greater than the depth of said grooves whereby the annuli are rockably connected.

12. A seal for a compressor shaft wherein a relatively long bearing surface is obtained with a minimum length of the shaft and in which the shaft bearing projects into the crank case, an annular shoulder on the portion of said shaft in the crank case, a sealing ring in the crank case snugly sleeved on said shaft and axially engaging the shoulder, means providing a flexible fluid tight joint between the sealing ring and the interior surface of the crank case through which the shaft extends, and mechanism for maintaining said sealing ring in contact with said shoulder including a spring urging the shaft endwise and seal aligning means between the inner end of the shaft bearing projecting into the casing and the sealing ring.

13. A seal for a compressor shaft wherein a relatively long bearing surface is obtained with a minimum length of the shaft and in which the shaft bearing projects into the crank case, an annular shoulder on the portion of said shaft in the crank case, a sealing ring in the crank case snugly sleeved on said shaft and axially engaging the shoulder, means providing a flexible fluid tight joint between the sealing ring and the interior surface of the crank case through which the shaft extends, and mechanism for maintaining the seal in contact with said shoulder including a spring urging the shaft endwise, and a thrust washer between said sealing ring and said bearing, said thrust washer and the inner end of said bearing being provided with complemental concave and convex surfaces.

14. A seal for a compressor shaft wherein a relatively long bearing surface is obtained with a minimum length of the shaft and in which the shaft bearing projects into the crank case, an annular shoulder on the portion of said shaft in the crank case, a sealing ring in the crank case snugly sleeved on said shaft and axially engaging the shoulder, means providing a flexible fluid-tight joint between the sealing ring and the interior surface of the crank case through which the shaft extends, and mechanism for maintaining said sealing ring in contact with said shoulder including a spring urging the shaft endwise and seal aligning means between the inner end of the shaft bearing projecting into the casing and the sealing ring, said spring exerting a force sufficient to overcome atmospheric pressure to resist the incursion of the atmosphere into the crank case when a pressure below that of the atmosphere prevails within the crank case.

In testimony whereof I affix my signature.

MAURICE E. JOYCE.